US011218509B2

(12) United States Patent
Pashman et al.

(10) Patent No.: US 11,218,509 B2
(45) Date of Patent: *Jan. 4, 2022

(54) SYSTEM AND METHOD FOR ORGANIZING A PLURALITY OF LOCAL MEETING GROUPS

(71) Applicant: Meetup, Inc., New York, NY (US)

(72) Inventors: David Pashman, New York, NY (US); Odile Beniflah, New York, NY (US); Jake Levine, New York, NY (US); Nick Stamas, New York, NY (US)

(73) Assignee: Meetup, Inc., New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/834,586

(22) Filed: Mar. 30, 2020

(65) Prior Publication Data
US 2020/0336512 A1    Oct. 22, 2020

Related U.S. Application Data

(63) Continuation of application No. 16/023,213, filed on Jun. 29, 2018, now Pat. No. 10,609,084, which is a
(Continued)

(51) Int. Cl.
*H04L 29/06*     (2006.01)
*H04W 4/021*    (2018.01)
(Continued)

(52) U.S. Cl.
CPC ......... *H04L 63/20* (2013.01); *G06Q 10/1095* (2013.01); *H04L 12/185* (2013.01);
(Continued)

(58) Field of Classification Search
CPC ... H04L 63/20; H04L 63/0807; H04L 63/107; H04L 67/02; H04L 12/185; H04W 4/80;
(Continued)

(56) References Cited

U.S. PATENT DOCUMENTS 6,519,629 B2   2/2003  Harvey et al.
6,819,919 B1   11/2004  Tanaka
(Continued)

FOREIGN PATENT DOCUMENTS

KR    1020060114986 A    11/2006

OTHER PUBLICATIONS

"Meetup Launches", Simon Willison's Weblog, http://simonwillison.net, Jun. 15, 2002.
www.glish.com, Online Weblog Archive, Jun. 15, 2002.

*Primary Examiner* — Michael S McNally
(74) *Attorney, Agent, or Firm* — The Webb Law Firm

(57) ABSTRACT

A system and method for facilitating supervisory control of localized meeting groups is provided. A method includes the steps of generating a master meeting group based on input received from a master organizer, generating a plurality of authentication tickets based on input received from the master organizer of the master meeting group identifying a local organizer for each authentication ticket of the plurality of authentication tickets, transmitting the plurality of authentication tickets to each of the local organizers, authenticating a plurality of local organizers based at least partially on an authentication ticket for each local organizer, and generating a plurality of meeting subgroups associated with the master meeting group based at least partially on the at least one meeting parameter. Each meeting subgroup is associated with at least one local organizer and is generated based at least partially on input received from the at least one local organizer.

20 Claims, 19 Drawing Sheets

Related U.S. Application Data continuation of application No. 15/157,685, filed on May 18, 2016, now Pat. No. 10,033,767.

(60) Provisional application No. 62/162,965, filed on May 18, 2015.

(51) Int. Cl.
| | | |
|---|---|---|
| *H04L 29/08* | (2006.01) | |
| *H04W 4/02* | (2018.01) | |
| *H04W 4/80* | (2018.01) | |
| *H04L 12/18* | (2006.01) | |
| *G06Q 10/10* | (2012.01) | |

(52) U.S. Cl.
CPC .......... *H04L 63/0807* (2013.01); *H04L 67/02* (2013.01); *H04W 4/021* (2013.01); *H04W 4/025* (2013.01); *H04W 4/80* (2018.02); *H04L 63/107* (2013.01)

(58) Field of Classification Search
CPC ... H04W 4/021; H04W 4/025; G06Q 10/1095
USPC .......................................................... 726/1
See application file for complete search history.

(56) References Cited

U.S. PATENT DOCUMENTS

| | | |
|---|---|---|
| 7,082,402 B2 | 7/2006 | Conmy et al. |
| 7,113,797 B2 | 9/2006 | Kelley et al. |
| 7,236,976 B2 | 6/2007 | Breitenbach et al. |
| 7,532,900 B2 | 5/2009 | Wilson et al. |
| 2004/0098275 A1 | 5/2004 | Hubert |
| 2006/0095376 A1 | 5/2006 | Mitchell et al. |
| 2007/0162547 A1 | 7/2007 | Ross |
| 2007/0282661 A1 | 12/2007 | Franco |
| 2008/0071874 A1 | 3/2008 | Roodman et al. |
| 2008/0086512 A1 | 4/2008 | Fahys |
| 2008/0098313 A1 | 4/2008 | Pollack |
| 2009/0222522 A1 | 9/2009 | Heaney |
| 2010/0009522 A1 | 1/2010 | Parkinson |
| 2010/0017371 A1* | 1/2010 | Whalin .................. G06Q 10/06 707/E17.014 |
| 2010/0198648 A1* | 8/2010 | Bank ................ G06Q 10/06311 705/7.19 |
| 2010/0235215 A1 | 9/2010 | Hardy et al. |
| 2011/0314533 A1* | 12/2011 | Austin .................... H04L 63/08 726/9 |
| 2014/0278673 A1* | 9/2014 | Wetzold ............. G06Q 10/1095 705/7.19 |

* cited by examiner

Copyright © 2016 Meetup, Inc.

Copyright © 2016 Meetup, Inc.

Copyright © 2016 Meetup, Inc.

Copyright © 2016 Meetup, Inc.

FIG. 12

SYSTEM AND METHOD FOR ORGANIZING A PLURALITY OF LOCAL MEETING GROUPS

CROSS REFERENCE TO RELATED APPLICATIONS

This application is a continuation of U.S. patent application Ser. No. 16/023,213, filed Jun. 29, 2018, which is a continuation of U.S. patent application Ser. No. 15/157,685, filed May 18, 2016 (U.S. Pat. No. 10,033,767), which claims benefit of priority from U.S. Provisional Patent Application No. 62/162,965, filed May 18, 2015, which are incorporated herein by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention relates generally to managing in-person meeting groups over a network environment and, in particular, a system and method for facilitating the management of a plurality of local in-person meeting groups at an administrative and/or supervisory level.

SUMMARY OF THE INVENTION

Generally, it is an object of the present invention to provide a system and method for organizing a plurality of local meeting groups that overcomes some or all of the deficiencies of the prior art.

According to a preferred and non-limiting embodiment, provided is a computer-implemented method for facilitating supervisory control of localized subgroups of a master group, comprising: generating a master meeting group based on input received from a master organizer, the input identifying a topic and at least one master meeting group parameter; generating a plurality of authentication tickets based on input received from the master organizer of the master meeting group, the input identifying a local organizer for each authentication ticket of the plurality of authentication tickets; transmitting the plurality of authentication tickets to each of the local organizers; authenticating a plurality of local organizers based at least partially on an authentication ticket for each local organizer; and generating a plurality of meeting subgroups associated with the master meeting group based at least partially on the at least one meeting parameter, wherein each meeting subgroup is associated with at least one local organizer and is generated based at least partially on input received from the at least one local organizer.

In non-limiting embodiments, generating the master meeting group may comprise creating a template including a plurality of master meeting group parameters, wherein the plurality of meeting subgroups are generated at least partially based on the template such that an associated local organizer can customize at least a portion of the parameters but cannot customize the topic or the at least one master meeting parameter. In some examples, each of the plurality of authentication tickets comprises a unique token that uniquely identifies a local organizer. Moreover, each of the plurality of authentication tickets may comprise a hyperlink including the unique token. In some embodiments, the at least one master meeting parameter may comprise a group name, and each meeting subgroup of the plurality of meeting subgroups may have a unique name that is based at least partially on the group name or includes at least a portion of the group name.

In some embodiments, each meeting subgroup may be associated with a plurality of in-person events hosted within a geographic region. Further, each authentication ticket may identify the geographic region. In some embodiments, the method may also include generating a user interface on at least one mobile device of a member of a meeting subgroup, the user interface comprising an attendance tool programmed or configured to input attendance information for an event associated with the meeting subgroup. In some examples, the attendance tool may comprise a list of members of the meeting subgroup and a plurality of selectable options associated with each member in the list of members that, when selected, indicate that a particular member attended the event.

According to another preferred and non-limiting embodiment, provided is a system for facilitating supervisory control of localized meeting groups affiliated with a master meeting group, including at least one server computer comprising at least one processor, the at least one server computer programmed and/or configured to: generate a master meeting group based on input received from a master organizer, the input identifying a topic and at least one master meeting group parameter; generate a plurality of tickets based on input received from the master organizer of the master meeting group, the input identifying a local organizer for each ticket of the plurality of tickets; transmit the plurality of tickets to each of the local organizers; authorize a plurality of local organizers based at least partially on a ticket for each local organizer; and generate a plurality of meeting subgroups associated with the master meeting group based at least partially on the at least one meeting parameter, wherein each meeting subgroup is associated with at least one local organizer and is generated based at least partially on input received from the at least one local organizer.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 12 illustrates a GUI for viewing and selecting members of meeting groups according to the principles of the present invention.

DETAILED DESCRIPTION OF THE PREFERRED EMBODIMENTS

Figure 1A:
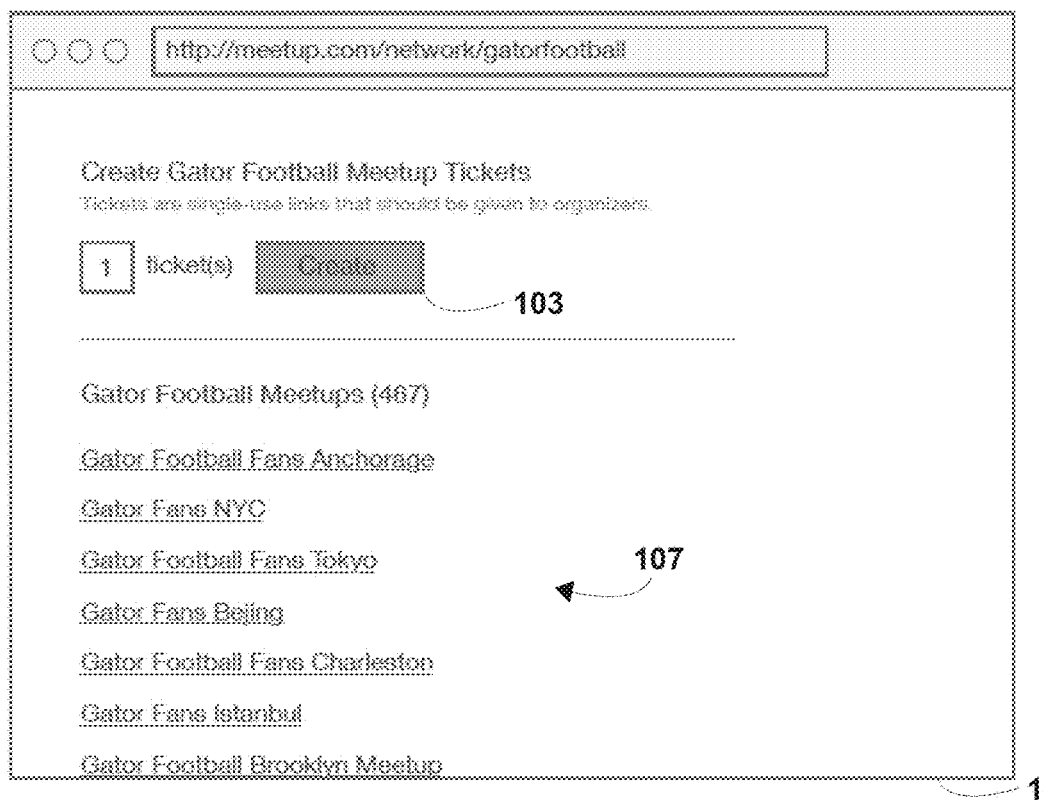
FIGS. 1A-1B illustrate graphical user interfaces (GUI) for creating authentication tickets for allowing organizers to start and/or organize a meeting group according to the principles of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous other arrangements are possible.

In non-limiting embodiments of the present invention, individual meetings may be created and managed through a meeting event platform such as that described in U.S. patent application Ser. No. 13/009,873 to Whalin et al., filed on Jan. 20, 2011 and titled "Web-Based Interactive Meeting Event Facility," the description of which is hereby incorporated by reference in its entirety.

In a preferred and non-limiting embodiment of the present invention, a system and method for organizing a plurality of localized meeting groups allows for a master organizer to create, manage, and/or control a plurality of localized meeting groups that are each co-organized by one or more community managers or local organizers. The term "local organizer," as used herein, refers to a user that has privileges to partially create, manage, and/or control (e.g., co-organize) a regional (e.g., localized) meeting group that is under the supervisory control of a master organizer. The present invention allows for a master organizer to, for example, start and grow local meeting groups and communities for a particular topic, enterprise, organization, and/or group that exists on a global or nationwide scale. In this manner, a master organizer may manage a plurality of localized meeting groups (e.g., chapters) through a single account and log-in (i.e., a "mothership" or "parent" account). Such management may allow for control of at least certain aspects of the localized meeting groups at a supervisory level by a master organizer, without requiring the master organizer to individually manage and/or maintain all aspects of each localized meeting group.

As an example, a company that maintains a software development platform may want to encourage local meeting groups of software developers specializing or otherwise interested in that platform. To do so, the company may create a master meeting group that specifies certain master meeting group parameters such as, for example, a topic (e.g., the software development platform), at least a portion of a title, sponsorship available to the local meeting groups, number of members, meeting times, meeting agendas, and/or the like. In some examples, a master organizer may want to specify a particular date and/or time for a meeting to occur for all of the localized meeting groups affiliated with the master meeting group. The master meeting group parameters may define a template for certain aspects of the localized meeting groups and/or events hosted by the localized meeting groups.

In a preferred and non-limiting embodiment of the present invention, a master organizer for an enterprise or other type of organization may pay a fee to the meeting group platform to allow for a plurality of localized meeting groups to be created as a subset of the master meeting group (e.g., affiliated with the master meeting group). In this manner, local organizers may be able to start local meeting groups that are affiliated with the master meeting group without, or with fewer, fees. The master organizer can thereby encourage the creation and organization of a number of localized meeting groups by local organizers, at a regional level, to promote and further the goals, projects, and/or agendas of the enterprise or organization. It will be appreciated that, in other non-limiting embodiments, the master organizer may not be required to pay any fees. Various fee structures and fee-sharing schemas are also contemplated.

Referring now to FIG. 1A, a graphical user interface (GUI) for creating tickets 101 is shown according to a preferred and non-limiting embodiment. As used herein, the terms "ticket" or "tickets" refer to one or more invitations, links, tokens, and/or other authorization mechanisms that provide local organizers with the authority to create a new localized meeting group that is affiliated with a master meeting group, or to affiliate an existing localized meeting group with a master meeting group. As an example, a master organizer for an enterprise or other organization may access the GUI 101 through a website or mobile application log-in or by other means. The GUI 101 may include a list 107 of associated local meeting groups, including a name for each local meeting group and a count of the number of affiliated localized meeting groups (e.g., "467" in the example shown). The GUI 101 may also include a ticket creation option 103. As shown in FIG. 1A, the ticket creation option 103 comprises a button and an input field for the master organizer to input a number of tickets. However, it will be appreciated that the ticket creation option 103 may comprise any number of different selectable options for a master organizer to choose including, for example, various input fields to input email addresses of local organizers, invitation text, and/or the like. As used herein, the term "selectable options" may refer to one or more aspects of a GUI for facilitating user input such as, but not limited to, push buttons, radio buttons, checkboxes, drop-down menus, input fields, and/or the like.

Figure 1B:
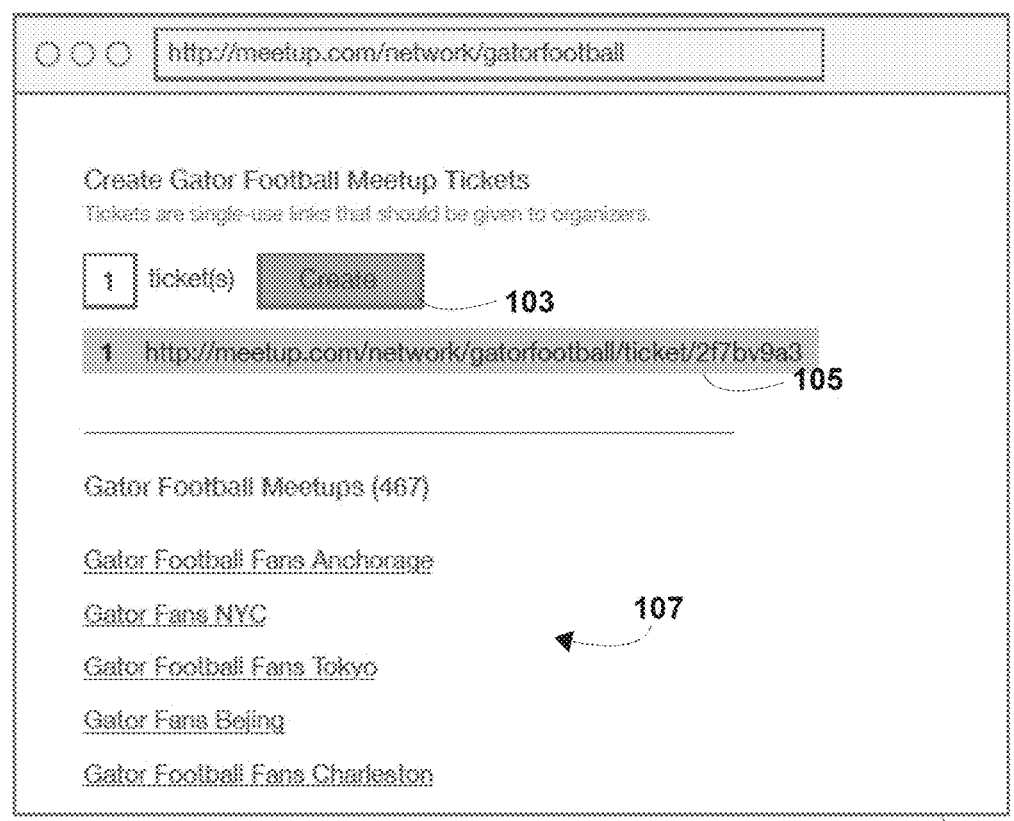

Referring now to FIG. 1B, a further view of the ticket creation GUI 101 is shown according to a preferred and non-limiting embodiment. Here, the ticket creation option 103 has been selected and a link 105 is generated and displayed on the GUI 101. As shown, the link 105 includes a unique token (e.g., "2f7bv9a3") generated for the ticket. The token may be generated through any number of mechanisms, including but not limited to a random number generator, a hash function, and/or the like. The link 105, when selected by a recipient, may allow for a user to be authorized to create and/or organize a local meeting group that is affiliated with the master meeting group. For example, when a recipient navigates to the URL embodied in the link, the token may be used to allow for one-time-only access to a further GUI that allows for the user to create a local meeting group or affiliate an existing meeting group with the master meeting group. It will be appreciated that a ticket may be accepted and/or redeemed by a recipient in various other ways.

Figure 2:
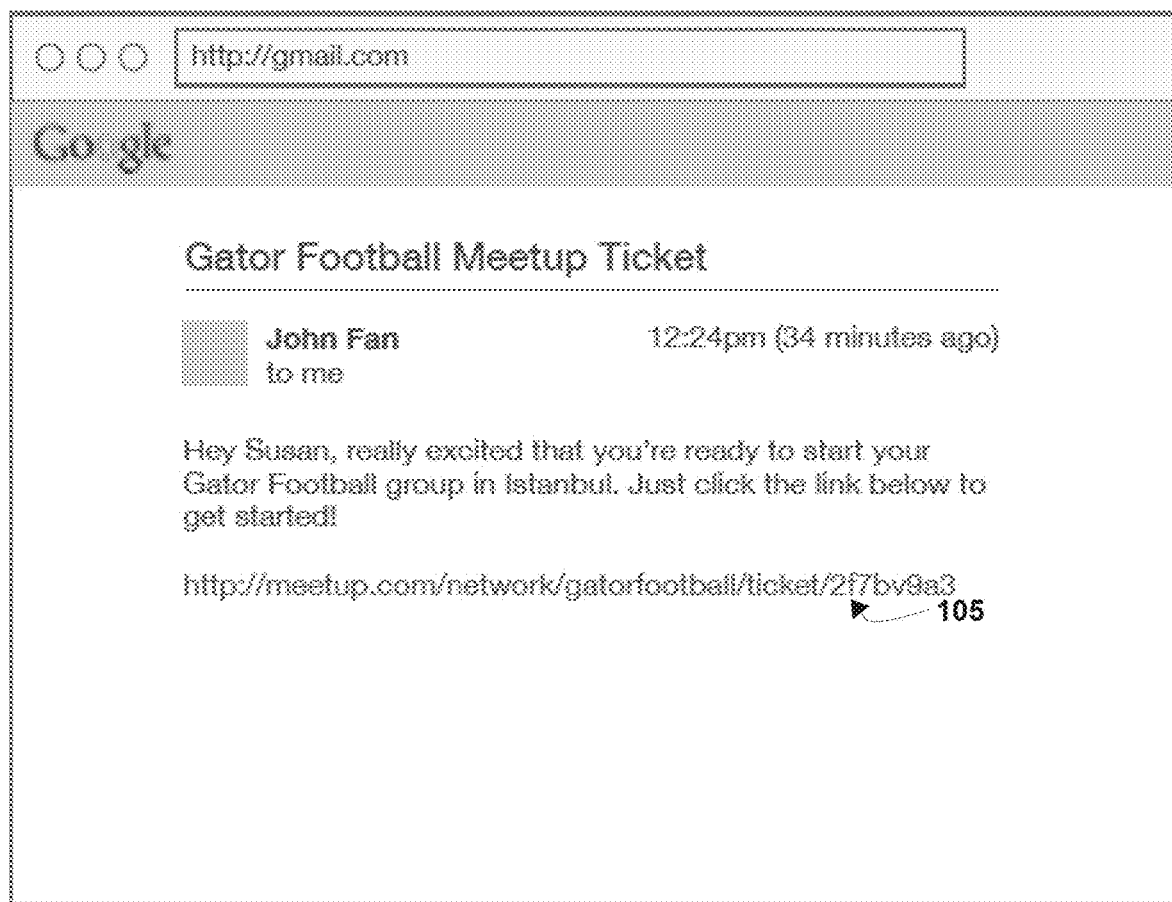
FIG. 2 illustrates an email communication including an authentication ticket according to the principles of the present invention.

Referring now to FIG. 2, an email communication 201 of a ticket is shown according to a preferred and non-limiting embodiment. The email communication 201 may include the link 105 generated through the GUI 101 shown in FIGS. 1A and 1B. The email communication 101 may be automatically generated by the platform at the request of the master organizer or, in other examples, may be custom written by the master organizer through the GUI 201 shown in FIGS. 1A and 1B or a separate GUI. In other examples, the link 105 may be copied into an email or other form of communication that is sent from the master organizer to another individual. Upon selecting the link 105, the user may be taken to the ticket redemption GUI 301 shown in FIGS. 3A and 3B. It will be appreciated that the link 105 may also be conveyed via text messaging, social media messaging, instant messaging, and/or other like electronic communications.

Figure 3A:
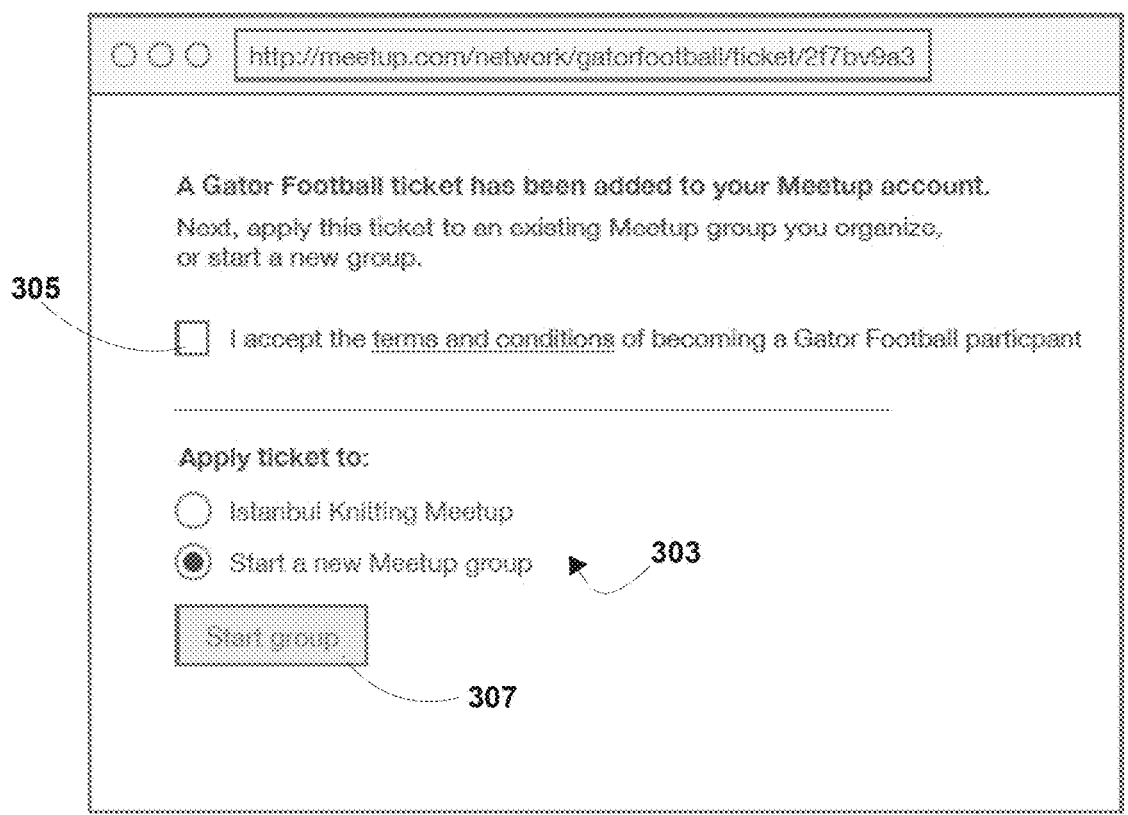
FIGS. 3A-3B illustrate GUIs for accepting an authentication ticket according to the principles of the present invention.
Figure 3B:
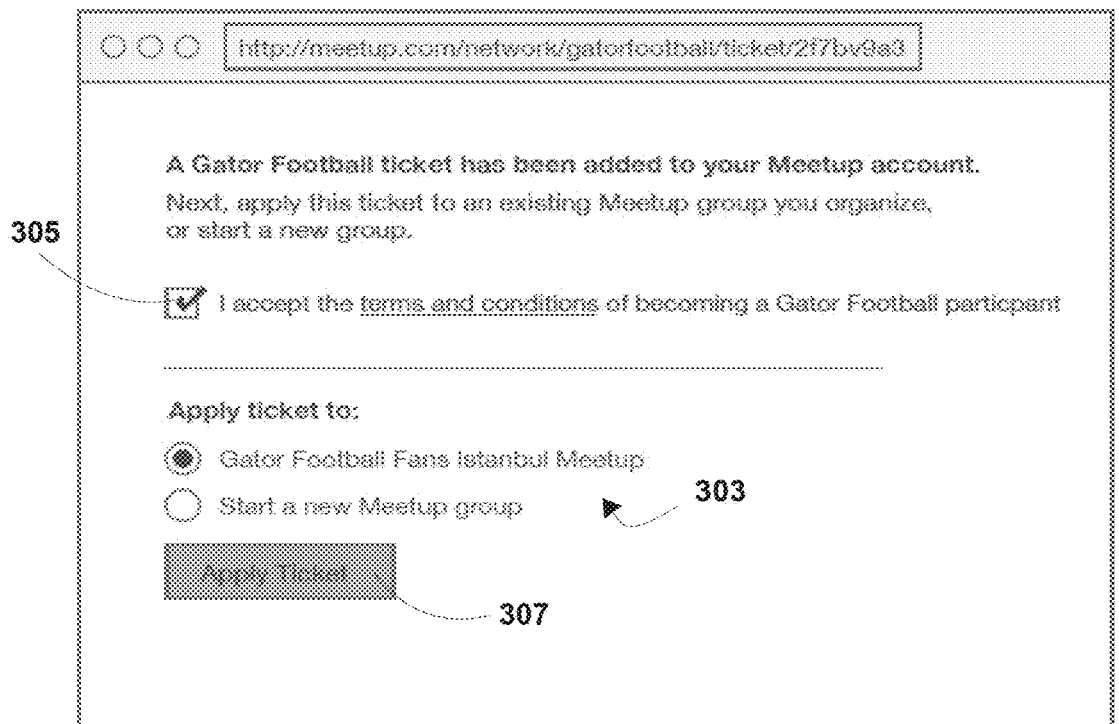

Referring now to FIGS. 3A and 3B, a ticket redemption GUI 301 is shown according to a preferred and non-limiting embodiment. The ticket redemption GUI 301 may be displayed upon a user selecting the link 105 containing the ticket or upon entering in an authorization code, token, or the like into an interface. The ticket redemption GUI 301 may also include a selectable option 305 for agreeing to terms and conditions. As shown in FIG. 3A, a ticket may be applied to a user's existing account on the platform or, alternatively, may be used to create an account through the platform. Tickets may allow for a user to become an organizer for an existing local meeting group affiliated with a master meeting group or start a local meeting group that is affiliated with a master meeting group. The default ticket redemption GUI 301 may be used for starting a new local meeting group, as shown in FIG. 3A, although various implementations are possible. However, through the use of selectable options 303, the user may also have the option of applying the ticket to an existing meeting group, thereby affiliating the existing group with the master meeting group.

With reference to FIG. 3B, the ticket redemption GUI 301 is shown with the selectable option 305 chosen to indicate acceptance of the terms and conditions. A button 307 may change from "Start group" to "Apply ticket," as an example, depending on what selectable option 303 is chosen. FIG. 3B also shows that a user has selected to apply the ticket to an existing local meeting group (e.g., Gator Football Fans Istanbul Meetup) instead of starting a new local meeting group. In this manner, by redeeming the ticket (e.g., choosing to "Apply Ticket"), the user can either become the local organizer for the existing local meeting group (that is already affiliated with the master meeting group) or convert the existing local meeting group (that is not yet affiliated with the master meeting group) to an affiliated group.

Figure 4:
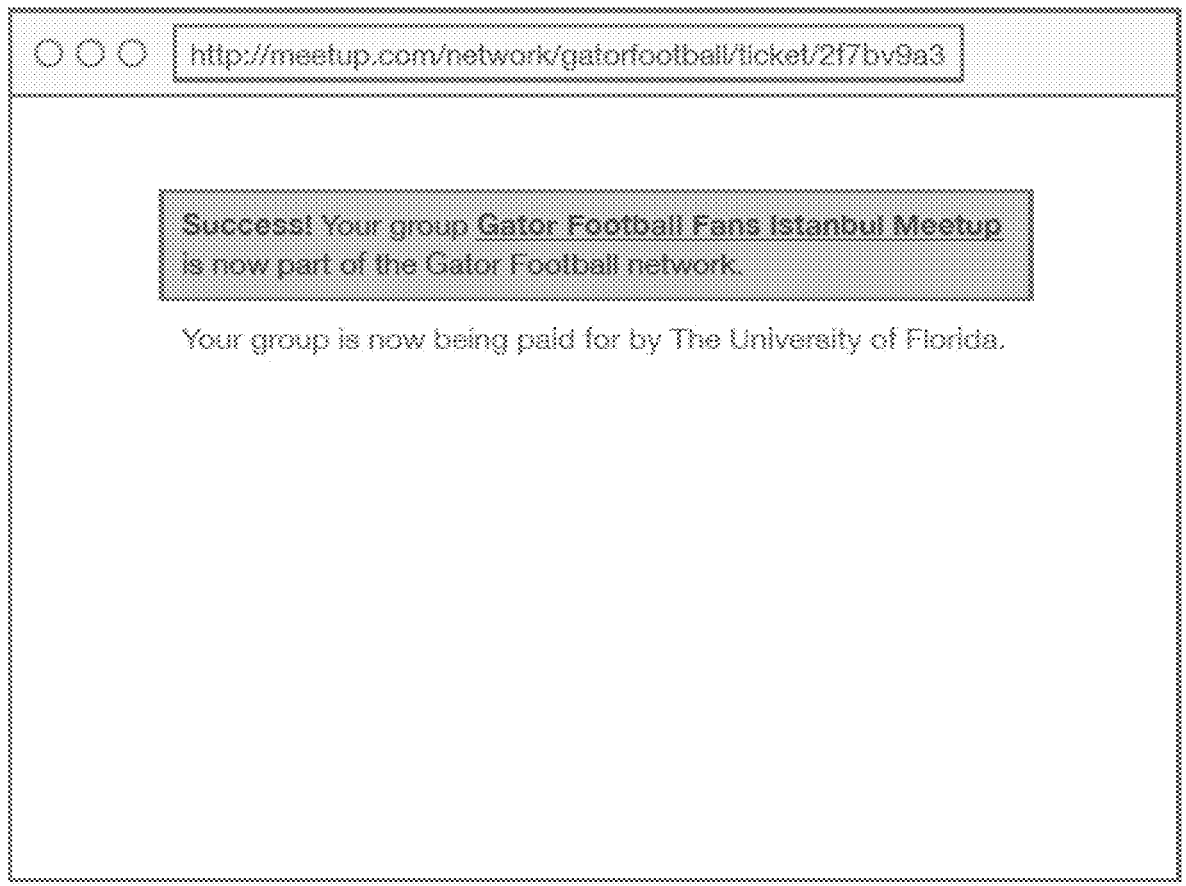
FIG. 4 illustrates a GUI for indicating that an authentication ticket is accepted according to the principles of the present invention.

Referring now to FIG. 4, an acceptance GUI 401 is shown according to a preferred and non-limiting embodiment. The acceptance GUI 401 may indicate, for example, that the existing local meeting group is now affiliated with the master meeting group or that a new local meeting group has been successfully created.

Figure 5:
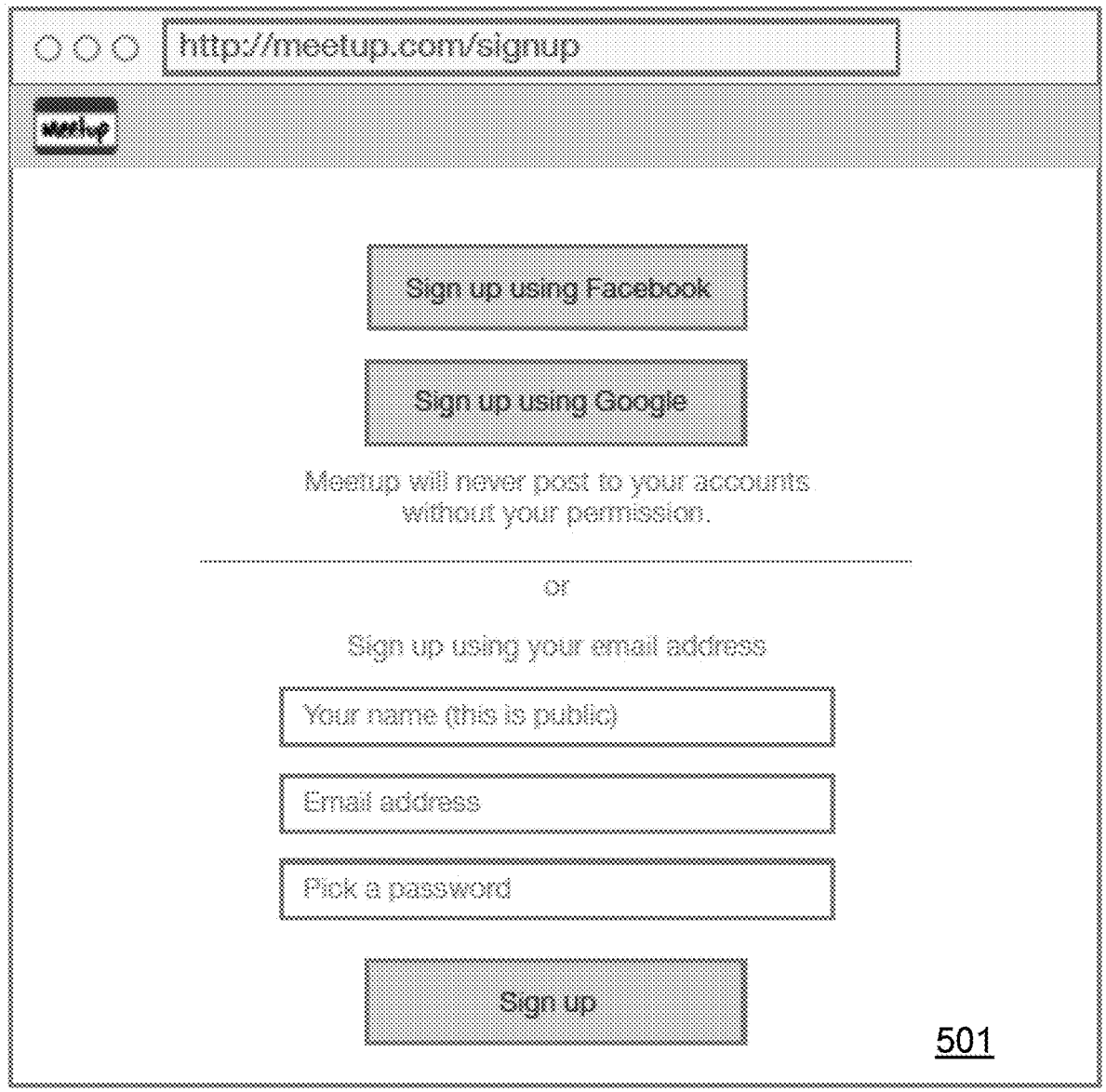
FIG. 5 illustrates a GUI for signing into the system according to the principles of the present invention.
Figure 6:
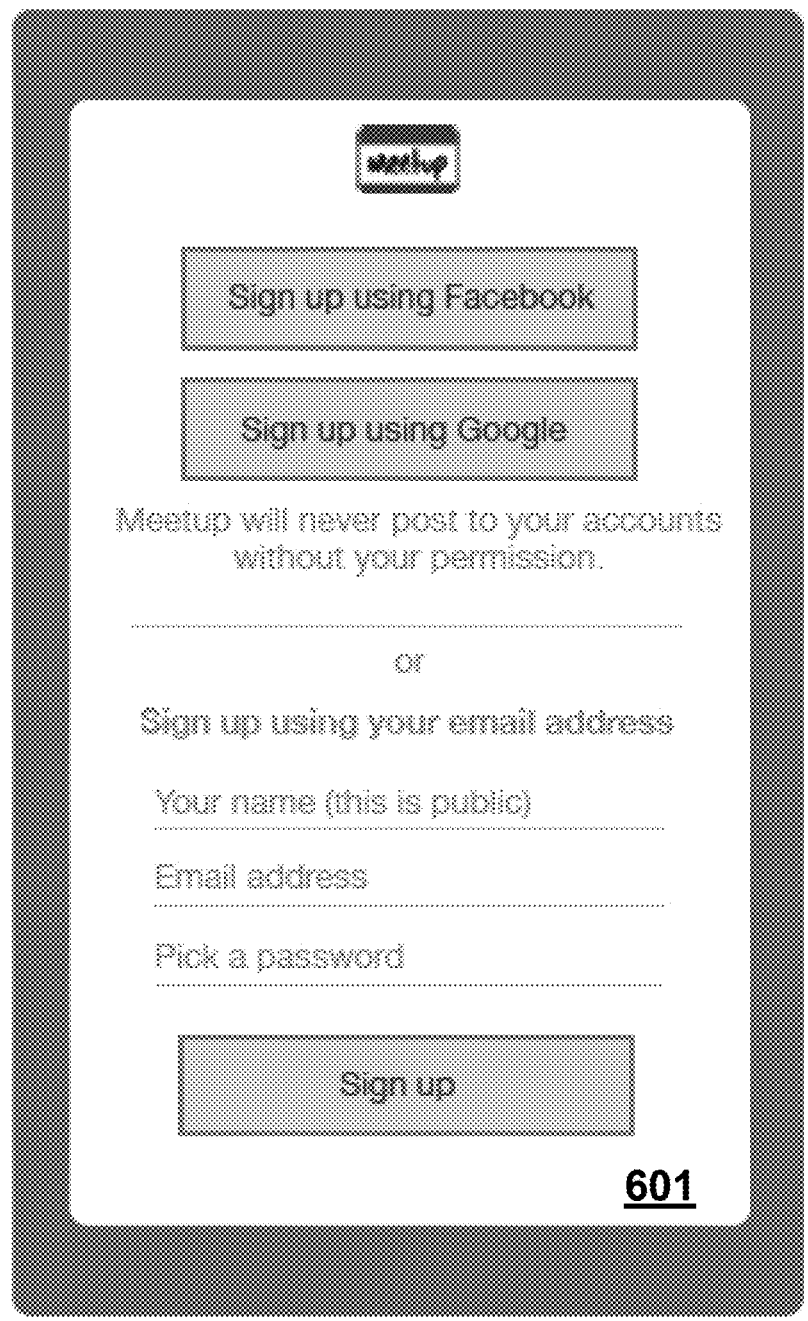
FIG. 6 illustrates a GUI for signing into the system on a mobile device according to the principles of the present invention.

Referring now to FIGS. 5 and 6, sign-up GUIs are shown for a meeting platform according to a preferred and non-limiting embodiment. FIG. 5 illustrates a desktop sign-up GUI 501, and FIG. 6 illustrates a mobile sign-up GUI 601. The sign-up pages may allow a user to sign in to a meeting group platform using an existing account for a third-party service provider (e.g., Facebook or Google in the examples shown).

Figure 7A:
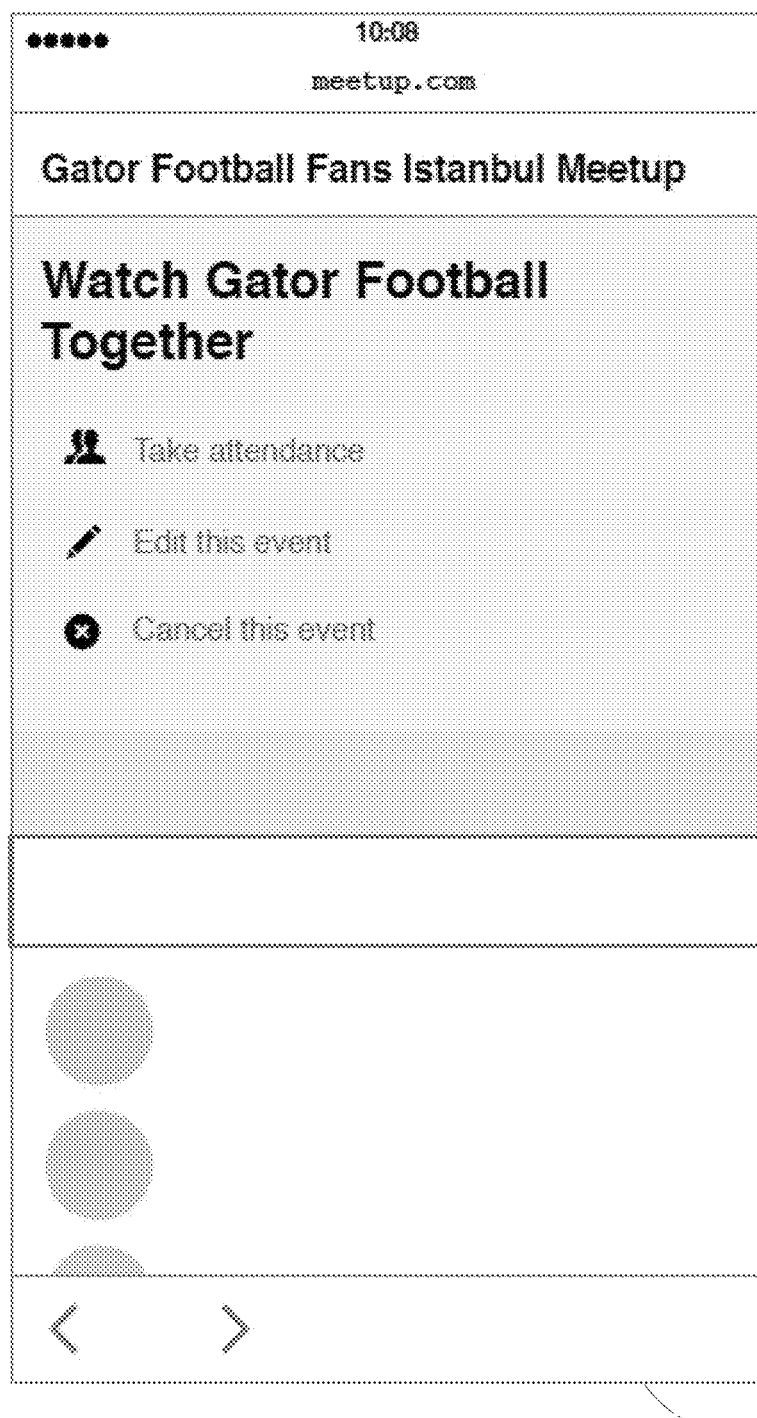
FIGS. 7A-7D illustrate an attendance tool GUI according to the principles of the present invention.

FIG. 7A illustrates an event GUI 701 according to a preferred and non-limiting embodiment. The event GUI 701 may be displayed to local organizers and/or local meeting event hosts and include selectable options to, for example, take attendance for an event associated with a local meeting group, edit event information for an event associated with a local meeting group, and/or cancel an event associated with a local meeting group. The event GUI 701 shown in FIG. 7A is a mobile GUI that is displayed on a mobile device, such as a smartphone. Upon selecting the take attendance option, a user may be brought to an attendance tool GUI 703 shown in FIG. 7B. In some non-limiting embodiments, the event GUI 701 may be automatically displayed in response to determining that an event is occurring or is soon to occur based on a date and/or time of the event and a current date and/or time.

Figure 7B:
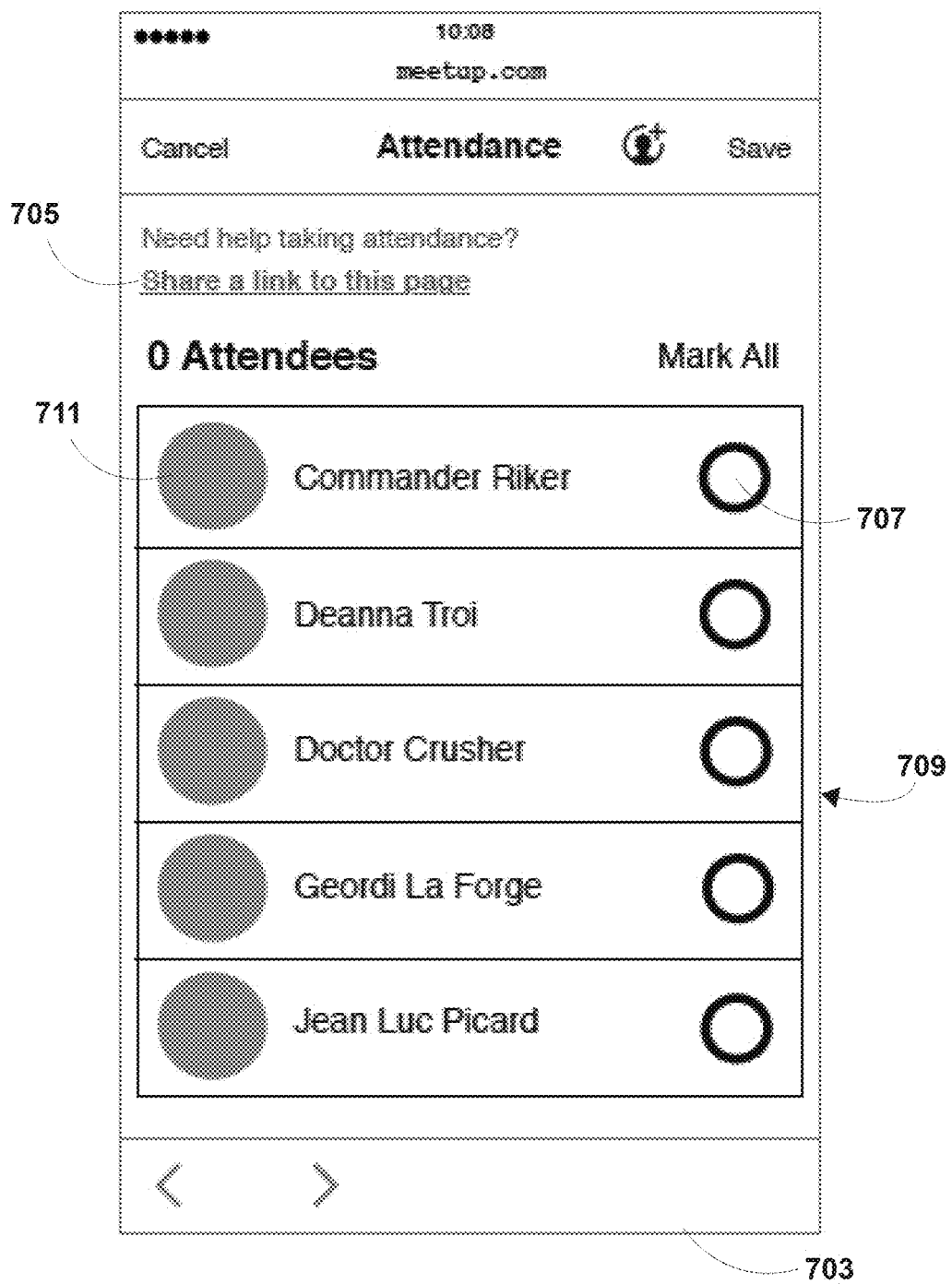

Referring now to FIG. 7B, an attendance tool GUI 703 is shown according to a preferred and non-limiting embodiment. The attendance tool GUI 703 includes a list of possible attendees 709 for a local event that is affiliated with a master meeting group. The list of possible attendees 709 may be comprised of a list of users that submitted RSVPs to the event or, alternatively, a list of all users that belong to a local meeting group. It will be appreciated that the list may be compiled in various other ways. Each entry on the list may include an image 711 or other icon representing the user and a selectable option 707 to indicate whether the user attended the event. Another selectable option 705 may facilitate a local organizer or an event host to share the attendance tool GUI 703 with other users to allow one or more individuals to take attendance. Information input into the attendance tool GUI 703 may be transmitted to a server where it is stored, or it may be stored locally on a mobile device until it can be transmitted to a server.

Figure 7C:
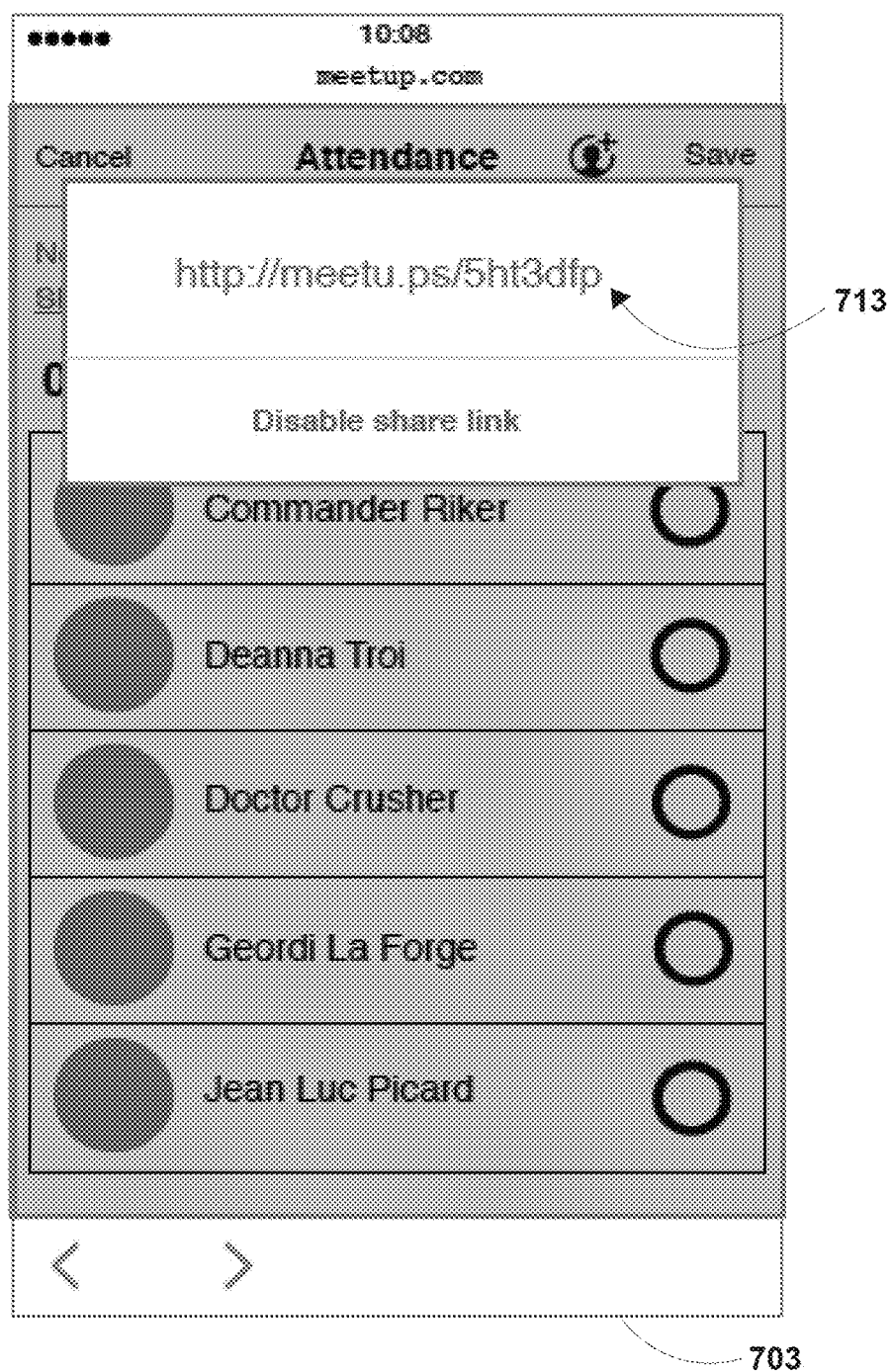

FIG. 7C illustrates the attendance tool GUI 703 according to a preferred and non-limiting embodiment. Here, the local organizer or event host has chosen to share the attendance tool GUI 703 with other users to facilitate the taking of attendance. A link 713 is generated for allowing other users to access the attendance tool GUI 703 and input attendance information. The link 713 may be automatically transmitted to selected users or may be shared through any other electronic means (e.g., email, instant message, text message, etc.). In a preferred and non-limiting embodiment, any user with access to the link 713 may be able to access the tool. The meeting group organizer and/or event host may be able to disable the share link so that guest users of the attendance tool GUI 703 are unable to share access to the attendance tool GUI 703 with anyone else.

Figure 7D:
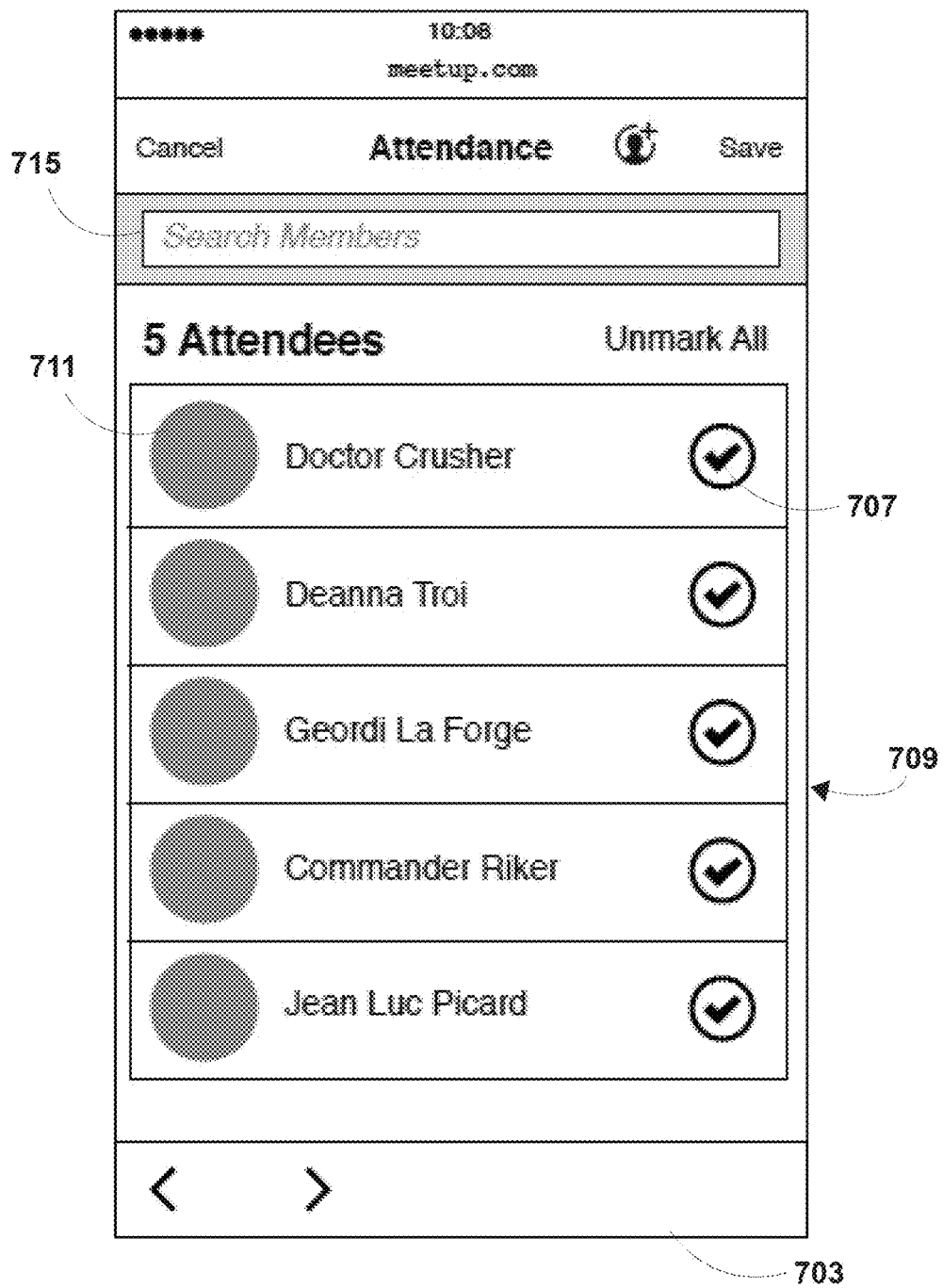

Referring now to FIG. 7D, the attendance tool GUI 703 is shown with several attendees selected. Selectable options 707, to indicate whether a user attended the event, may be a checkmark, symbol, or different color, as examples, to specify which users have attended and which users have not. It will be appreciated that various other indications may be used, and that the indications may be part of or separate from the selectable options 707 that are displayed on the attendance tool GUI 703. By allowing multiple users to have access to the attendance tool GUI 703, as explained above, local meeting organizers and event hosts can ensure that attendance is properly taken. As shown in FIG. 7D, a search option 715 may also be provided to allow for users to search for particular attendees.

It will be appreciated that, in non-limiting embodiments, users may check in to events through the use of their mobile devices. For example, the location of a user's mobile device, as determined through a GPS unit or other sensor information, may be used to automatically confirm that a particular user has attended the event by comparing location information of the device during the time of the event with the location of the event.

Figure 8:
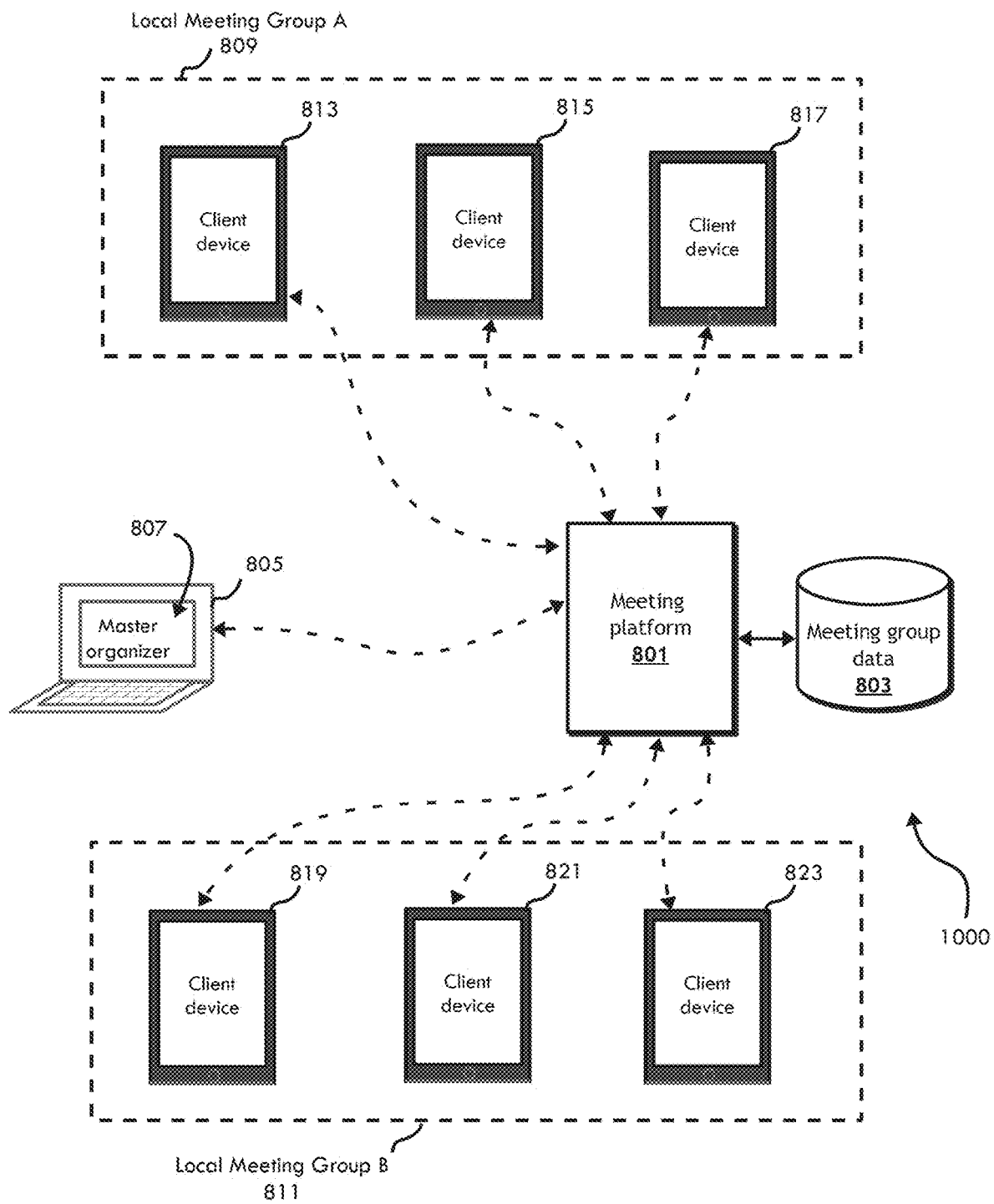
FIG. 8 illustrates a schematic diagram of one embodiment of a system for organizing in-person meetings according to the principles of the present invention.

Referring now to FIG. 8, a system 1000 for organizing a plurality of localized meeting groups is shown according to a preferred and non-limiting embodiment. A meeting platform 801 may include one or more server computers and software for providing GUIs and other data to devices, and for receiving data from devices. A meeting group database 803 may include one or more data structures for organizing master meeting group parameters, local meeting groups, and events. A computer 805 used by a master organizer is in communication with the meeting platform 801 and displays a GUI 807 that allows for a master organizer to input master meeting group parameters, generate tickets, and manage the localized meeting groups associated with a master meeting group.

With continued reference to FIG. 8, a local meeting group A 809 has several users, including client devices 813, 815, 817. This local meeting group 809 is affiliated with the master meeting group created and/or managed by the master organizer and may be associated with a particular region. For example, if the master meeting group is for Android developers, the local meeting group 809 may be a New York-based Android developer meeting group. Likewise, a local meeting group B 811 may include client devices 819, 821, 823 and may be a Pittsburgh-based Android developer meeting group. Both local meeting groups 809, 811 are affiliated with the master meeting group for Android developers, and there may be many more localized meeting groups that are also affiliated with that master meeting group. As another example, if the master meeting group is for Gator football fans, local meeting groups 809, 811 for Gator football fans may be in two different geographic areas. In this manner, local meeting groups can be created wherever there are parties interested in a particular topic or agenda of a master meeting group.

Figure 9:
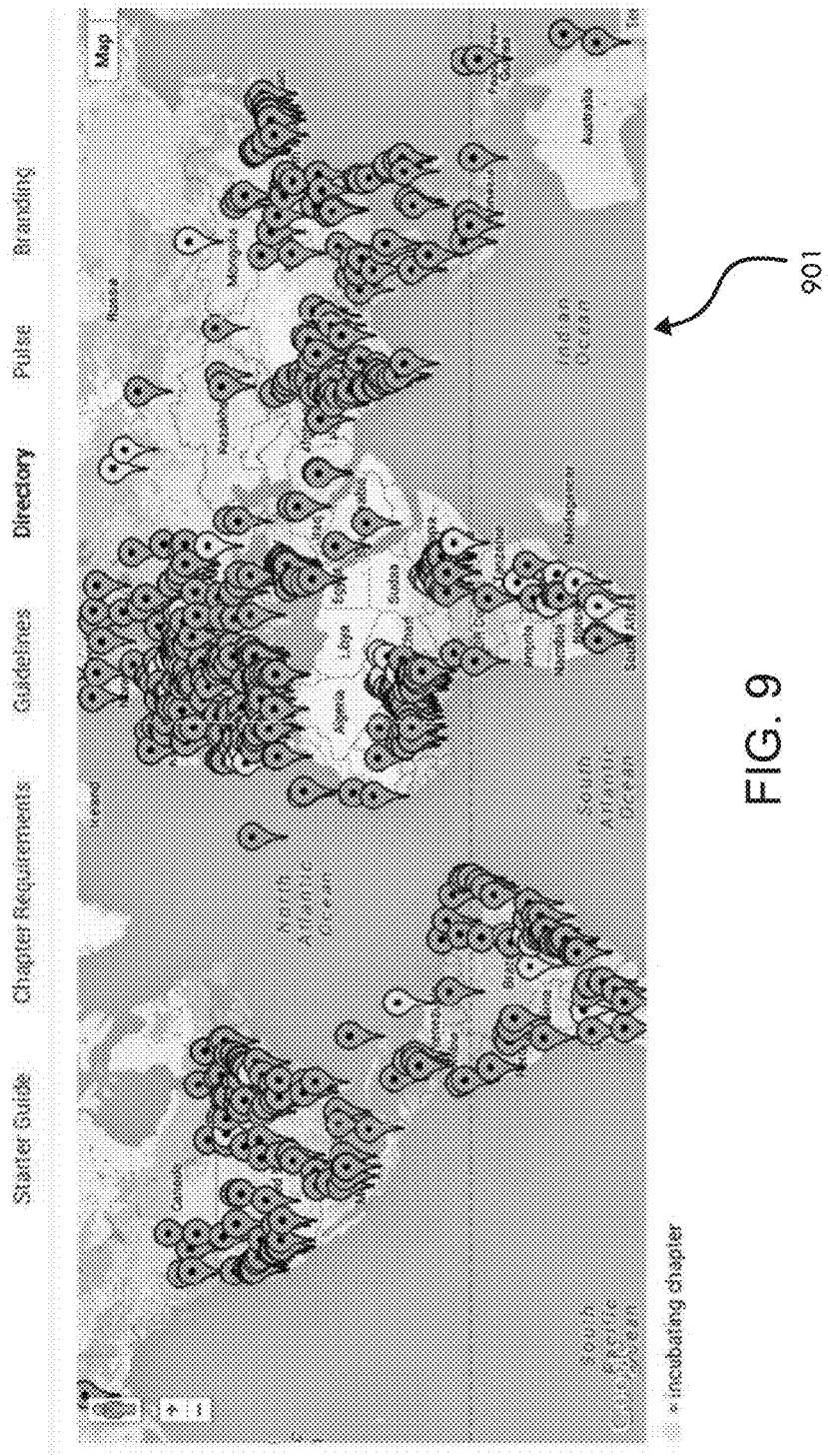
FIG. 9 illustrates a map interface showing a plurality of local meeting groups affiliated with a master meeting group according to the principles of the present invention.

Referring now to FIG. 9, a map interface 901 is shown according to a preferred and non-limiting embodiment. The system may generate the map interface 901 for a particular master meeting group to illustrate the locations of each localized meeting group affiliated with that master meeting group. In the example shown in FIG. 9, the pins on the world map represent localized meeting groups that are affiliated with a master meeting group. The pins may differ based on the type of the local meeting groups or a current state of the local meeting groups. For example, established local meeting groups may be displayed with green pins and pending (or currently incubating) local meeting groups may be displayed with yellow pins. It will be appreciated that various legend schemes may be used to differentiate between local meeting groups. Further, in non-limiting embodiments, users may perform searches for local meeting groups through the map interface 901 by zooming into a particular geographic region to see all local meeting groups in that area or by inputting a topic to find local meeting groups having the same or similar topic.

In a preferred and non-limiting embodiment, the master meeting group parameters input by a master organizer may be used to generate one or more templates for a meeting group or event. Such templates may define predetermined aspects of a meeting group or event, such as but not limited to title, time, topic, meeting place, and/or the like, as well as one or more aspects of GUIs that are displayed to local organizers and/or participants. For example, the look and feel of a meeting group facility, such as but not limited to the layout of information, font, color schemes, graphics, and/or the like, may be predetermined by the master organizer and/or selected from a plurality of options. In this way, a master organizer can copy and paste meeting groups or events to facilitate the creation of additional groups or events and expansion of the master meeting group network.

Figure 10A:
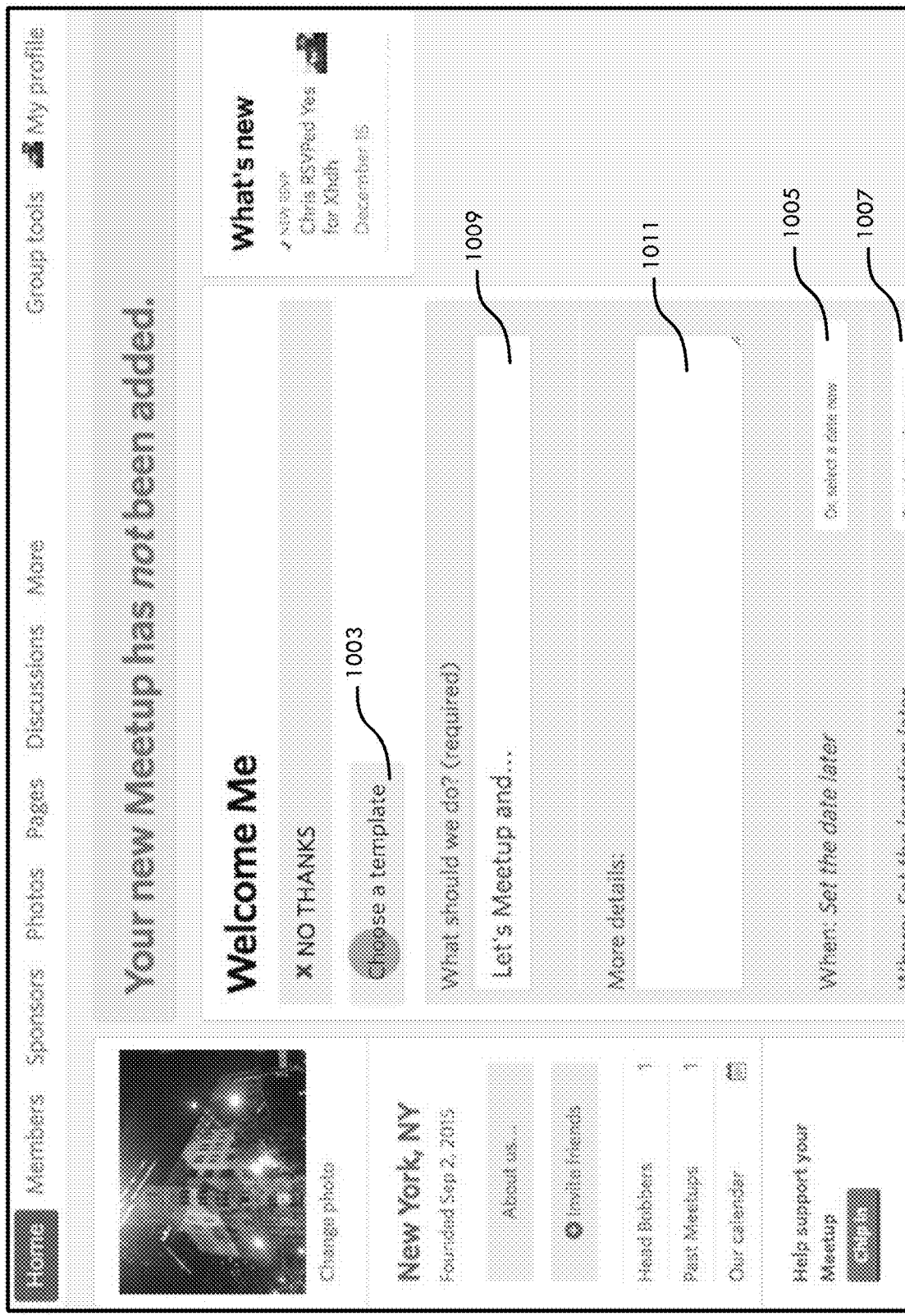
FIG. 10A illustrates a GUI for scheduling an event according to the principles of the present invention.

Referring now to FIG. 10A, an event scheduling GUI 1001 is shown according to a preferred and non-limiting embodiment. The event scheduling GUI 1001 may be presented to a local organizer to schedule a local event or, in some examples, may be presented to a master meeting group organizer to schedule an event for several local meeting groups. The GUI 1001 includes a selectable option 1005 for choosing a date for the event. As can be seen in FIG. 10A, the organizer may also have an option to set the date at a later time instead of specifying one when the event is first created. A selectable option 1007 for choosing a location can likewise be used by an organizer to set a location, such as a venue, or the organizer may choose to set a location at a later time. A text box 1009 also allows an organizer to enter a title or identifying description for the event. Further information about the event may also be input into another text box 1011.

Figure 10B:
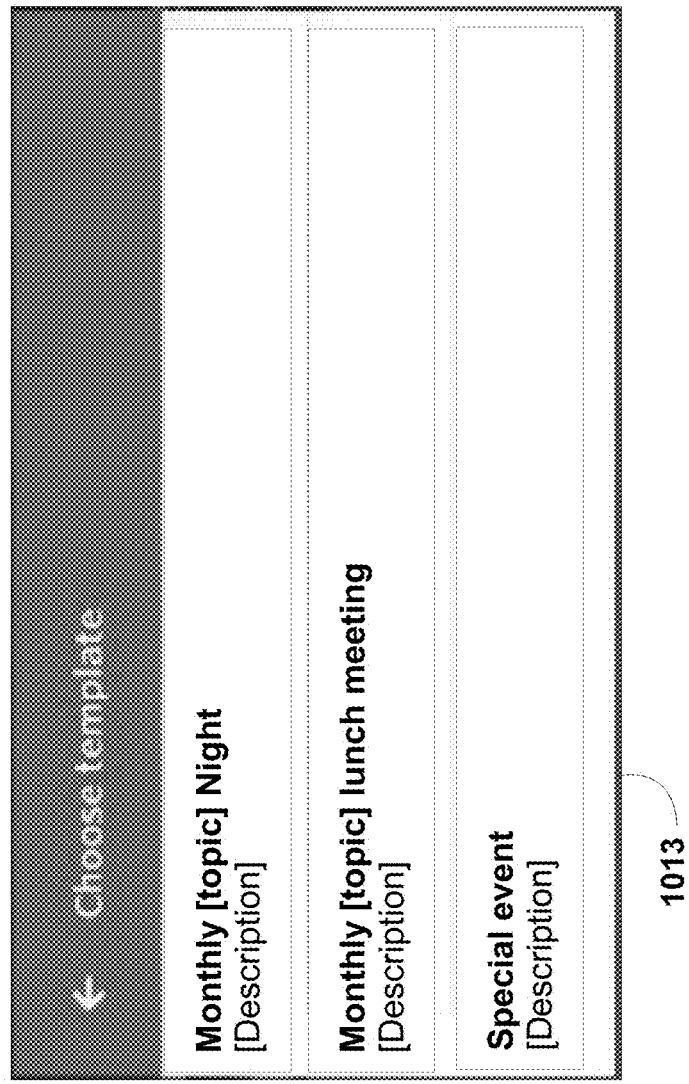
FIG. 10B illustrates a GUI for choosing a template for scheduling an event according to the principles of the present invention.

With continued reference to FIG. 10A, the event scheduling GUI 1001 includes a template option 1003 which, when selected, displays a template selection GUI 1013 shown in FIG. 10B. Through the template selection GUI 1013, an organizer can choose from a plurality of predefined options to facilitate the scheduling of an event. As an example, the templates may include predefined master meeting group parameters, such as but not limited to event title, event description, event date, event time, event venue, agenda, minimum or maximum attendance requirements, and/or the like. As shown in FIG. 10B, the template selection GUI 1013 includes templates for a monthly evening meeting, a monthly lunch meeting, and a special event. It will be appreciated that various other templates may be available. Moreover, the templates may be created by a master meeting group organizer, one or more local meeting group organizers, and/or be predefined by the meeting group platform.

Figure 11A:
FIGS. 11A-11C illustrate activity GUIs according to the principles of the present invention.
Figure 11B:
Figure 11C:
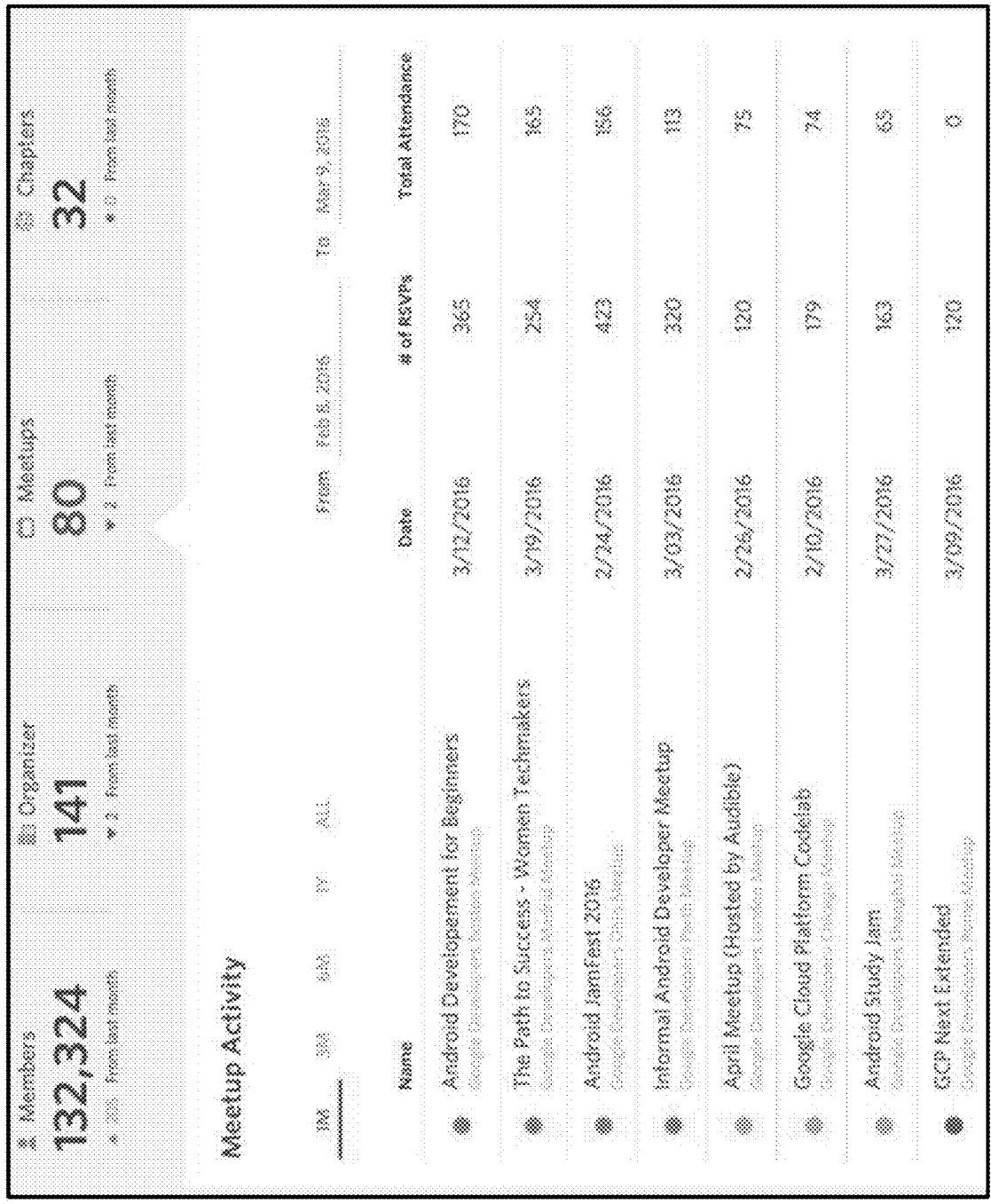

Referring now to FIGS. 11A-11C, activity GUIs are shown according to preferred and non-limiting embodiments. FIG. 11A shows a member activity GUI 1101 that displays member activity data. In this example, a graph is shown to display the number of members over a time period. Selectable options may be provided to change the time period. FIG. 11B shows an organizer activity GUI 1103 according to a preferred and non-limiting embodiment. The organizer activity GUI 1103 may show activity from various local meeting group organizers to a master meeting group organizer. As shown, local organizers are listed with a contact option and a status indication (i.e., stepped down, stepped up, etc.). FIG. 11C shows an event activity GUI 1105 according to a preferred and non-limiting embodiment. The event activity GUI 1105 displays the events across multiple local meeting groups, the dates of those events, the number of RSVPs, and the total number of attendees. Selectable options may be provided to change the time frame of the event data being displayed. It will be appreciated by those skilled in the art that the GUIs may be in any format and may include various meeting group and/or event parameters and visualizations (e.g., graphs, tables, charts, and/or the like) of those parameters. Various statistical and analytical data may also be generated and displayed.

Figure 12:
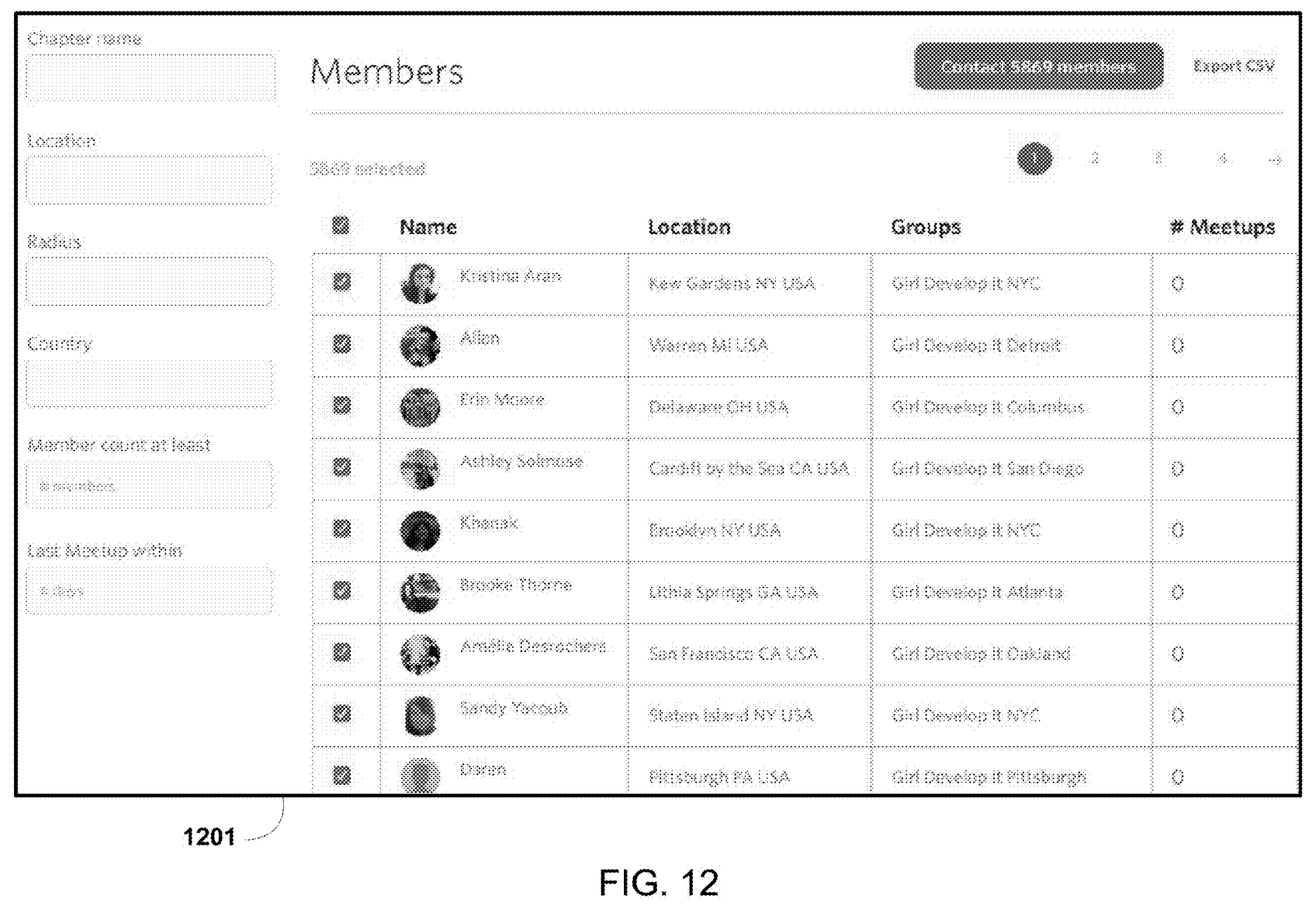

Referring now to FIG. 12, a member GUI 1201 is shown according to a preferred and non-limiting embodiment. The member GUI 1201 may be displayed to a master meeting group organizer for viewing and selecting members of meeting groups. Selectable options may be presented through the GUI 1201 for exporting member data and searching member data based on one or more parameters (e.g., chapter name, location, radius, country, member count, last event, and/or the like). The member GUI 1201 may also facilitate a master meeting group organizer to send messages to one or more selected members. As an example, a master meeting group organizer may select all members displayed on the member GUI 1201 based on search parameters, and send a mass email or other communication to each of those users.

In a preferred and non-limiting embodiment, one or more tags may be associated with a local meeting group or event. The tags may be identifiers or words that uniquely identify a group or event, or a subset of groups or events, that can be used to search for groups or events, recommend groups or events, or identify characteristics about a group or event. In some examples, one or more tags may be specified by the master organizer for associated local meeting groups. Tags may also be added by local organizers to the meeting groups or events. In some examples, a predefined set of tags may be specified or selected by a master organizer such that local organizers may choose tags to use from the predefined set to identify events. Further, local organizers may also specify their own tags to identify events and those tags and/or the predefined tags may be made available to master organizers to keep track of event types or topics.

Figure 13:
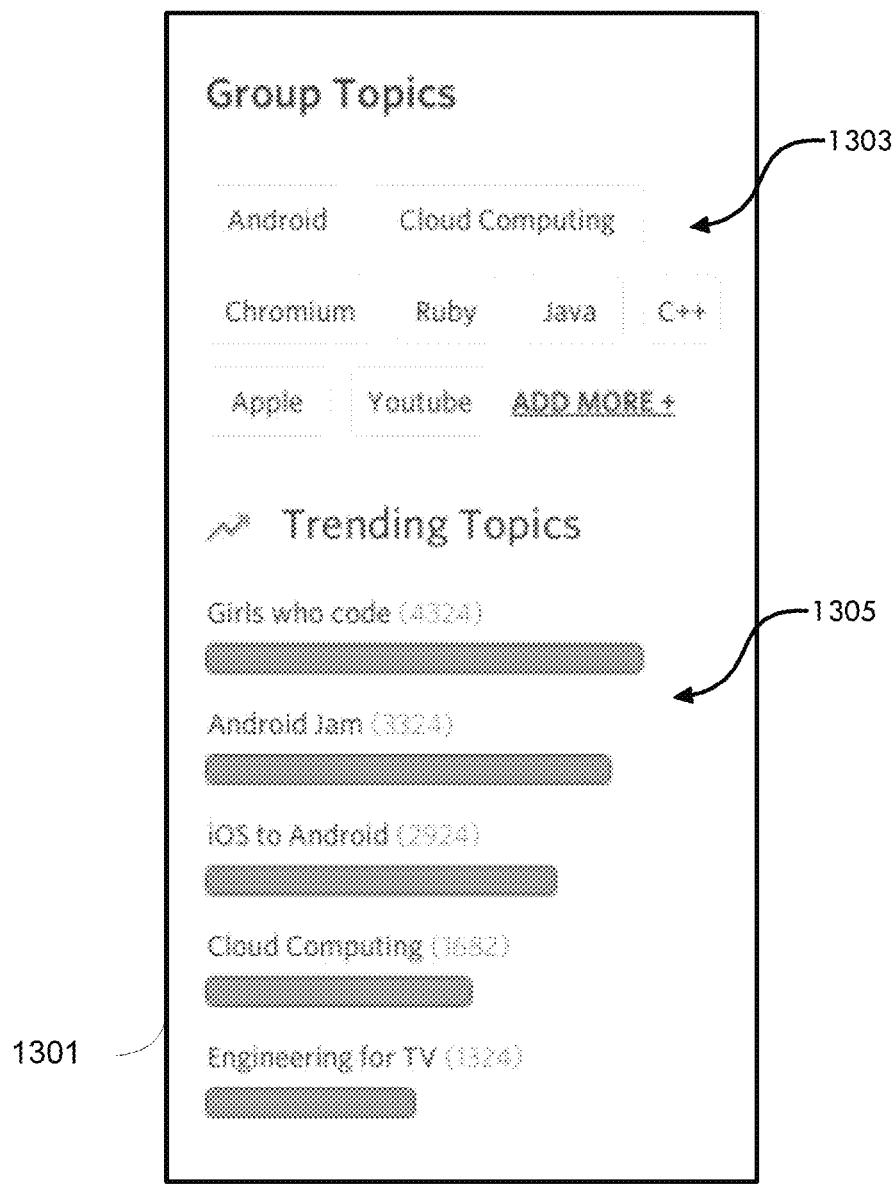
FIG. 13 illustrates a meeting group topic GUI according to the principles of the present invention.

Referring now to FIG. 13, a meeting group topic GUI 1301 is shown according to a preferred and non-limiting embodiment. The meeting group topic GUI 1301 includes a plurality of topic tags 1303 identifying various topics associated with a meeting group. As described above, local organizers and/or master meeting group organizers may specify one or more tags for an event or a meeting group, and these tags may be used by users of the platform to find meeting groups and/or events related to a topic of interest. The meeting group topic GUI 1301 also includes trending topic data 1305 listing popular topics across one or more meeting groups and/or events.

In a preferred and non-limiting embodiment, topics may be verified for exclusive use with a particular master meeting group. As an example, implementations of the system 1000 may allow master organizers to request that a particular topic be reserved for a master meeting group. A topic may be verified and/or made exclusive by a human administrator that reviews the requests or, in other embodiments, may be automatically verified and/or made exclusive by searching existing topics and determining that the topic is available. With reference to the above-described "Gator football" example, a verified topic may be called "Gator Football Fans" and may be exclusively associated with official subgroups (e.g., local meeting groups) for the Gator football master meeting group.

In a preferred and non-limiting embodiment, various data analytics and report generation tools may be provided to the master organizers and others for generating usage and activity statistics for groups and/or users. Statistics may concern the level of activity or engagement of users by analyzing a number of RSVPs, actual attendees, and/or other event data relating to meetings, meeting attendance, and user activity. In some embodiments, reports and analytics may be generated automatically and transmitted to master organizers in response to predetermined events or milestones occurring such as, for example, when a number of participants or local meeting groups meets or exceeds a threshold, after one or more events occur, and/or the like. Master organizers may also have "parent" or "mothership" accounts to allow them to manage multiple groups from within a single account.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for facilitating supervisory control of localized subgroups of a master group, comprising:
   generating, with at least one processor, a master meeting group based on input received from a master organizer, the input identifying a topic and at least one master meeting group parameter;
   generating, with at least one processor, a plurality of authentication tickets based on input received from the master organizer of the master meeting group, the input identifying a local organizer for each authentication ticket of the plurality of authentication tickets;
   transmitting the plurality of authentication tickets to each of the local organizers;
   authenticating, with at least one processor, a plurality of local organizers based at least partially on an authentication ticket for each local organizer; and generating, with at least one processor, a plurality of meeting subgroups associated with the master meeting group based at least partially on the at least one meeting parameter, wherein each meeting subgroup is associated with at least one local organizer and is generated based at least partially on input received from the at least one local organizer.

2. The computer-implemented method of claim 1, wherein generating the master meeting group comprises creating a template including a plurality of master meeting group parameters, and wherein the plurality of meeting subgroups are generated at least partially based on the template such that an associated local organizer can customize at least a portion of the parameters but cannot customize the topic or the at least one master meeting parameter.

3. The computer-implemented method of claim 1, wherein each of the plurality of authentication tickets comprises a unique token that uniquely identifies a local organizer.

4. The computer-implemented method of claim 3, wherein each of the plurality of authentication tickets comprises a hyperlink including the unique token.

5. The computer-implemented method of claim 1, wherein the at least one master meeting parameter comprises a group name, and wherein each meeting subgroup of the plurality of meeting subgroups has a unique name that is based at least partially on the group name or includes at least a portion of the group name.

6. The computer-implemented method of claim 1, wherein each meeting subgroup is associated with a plurality of in-person events hosted within a geographic region.

7. The computer-implemented method of claim 6, wherein each authentication ticket identifies the geographic region.

8. The computer-implemented method of claim 1, further comprising:
generating a user interface on at least one mobile device of a member of a meeting subgroup, the user interface comprising an attendance tool programmed or configured to input attendance information for an event associated with the meeting subgroup.

9. The computer-implemented method of claim 8, wherein the attendance tool comprises a list of members of the meeting subgroup and a plurality of selectable options associated with each member in the list of members that, when selected, indicate that a particular member attended the event.

10. A system for facilitating supervisory control of localized meeting groups affiliated with a master meeting group, comprising at least one server computer comprising at least one processor, the at least one server computer programmed and/or configured to:
generate a master meeting group based on input received from a master organizer, the input identifying a topic and at least one master meeting group parameter;
generate a plurality of tickets based on input received from the master organizer of the master meeting group, the input identifying a local organizer for each ticket of the plurality of tickets;
transmit the plurality of tickets to each of the local organizers;
authorize a plurality of local organizers based at least partially on a ticket for each local organizer; and
generate a plurality of meeting subgroups associated with the master meeting group based at least partially on the at least one meeting parameter, wherein each meeting subgroup is associated with at least one local organizer and is generated based at least partially on input received from the at least one local organizer.

11. The system of claim 10, wherein the master meeting group is generated by creating a template including a plurality of master meeting group parameters, and wherein the plurality of meeting subgroups are generated at least partially based on the template such that an associated local organizer can customize at least a portion of the parameters but cannot customize the topic or the at least one master meeting parameter.

12. The system of claim 10, wherein each of the plurality of authentication tickets comprises a unique token that uniquely identifies a local organizer.

13. The system of claim 10, wherein each of the plurality of authentication tickets comprises a hyperlink including the unique token.

14. The system of claim 10, wherein the at least one master meeting parameter comprises a group name, and wherein each meeting subgroup of the plurality of meeting subgroups has a unique name that is based at least partially on the group name.

15. The system of claim 10, wherein each meeting subgroup is associated with a plurality of in-person events hosted within a geographic region.

16. The system of claim 15, wherein each authentication ticket identifies the geographic region.

17. The system of claim 10, wherein the at least one server computer is further programmed or configured to generate a user interface on at least one mobile device of a member of a meeting subgroup, the user interface comprising an attendance tool programmed or configured to input attendance information for an event associated with the meeting subgroup.

18. The system of claim 17, wherein the attendance tool comprises a list of members of the meeting subgroup and a plurality of selectable options associated with each member in the list of members that, when selected, indicate that a particular member attended the event.

19. A computer program product for facilitating supervisory control of localized subgroups of a master group, comprising at least one non-transitory computer-readable medium including program instructions that, when executed by at least one processor, cause the at least one processor to:
generate a master meeting group based on input received from a master organizer, the input identifying a topic and at least one master meeting group parameter;
generate a plurality of tickets based on input received from the master organizer of the master meeting group, the input identifying a local organizer for each ticket of the plurality of tickets;
transmit the plurality of tickets to each of the local organizers;
authorize a plurality of local organizers based at least partially on a ticket for each local organizer; and
generate a plurality of meeting subgroups associated with the master meeting group based at least partially on the at least one meeting parameter, wherein each meeting subgroup is associated with at least one local organizer and is generated based at least partially on input received from the at least one local organizer.

20. The computer program product of claim 19, wherein the at least one master meeting parameter comprises a group name string, and wherein each meeting subgroup of the plurality of meeting subgroups has a unique name string that is based at least partially on the group name string or includes at least a portion of the group name string.

\* \* \* \* \*